United States Patent [19]

Jacobs et al.

[11] 4,070,448

[45] Jan. 24, 1978

[54] METHOD OF PRODUCING HIGH PURITY ALUMINUM CHLORIDE

[75] Inventors: Stanley C. Jacobs, Lower Burrell, Pa.; Larry K. King, Maryville, Tenn.

[73] Assignee: Aluminum Company of America, Pittsburgh, Pa.

[21] Appl. No.: 765,459

[22] Filed: Feb. 3, 1977

[51] Int. Cl.$^2$ ............................ C01F 7/58; C01F 7/62
[52] U.S. Cl. .................................... 423/495; 423/136; 423/137; 423/496; 55/30; 55/71; 55/82; 423/DIG. 16
[58] Field of Search ............... 423/495, 496, 136, 137, 423/659 F, DIG. 16; 55/82, 30, 71

[56] References Cited

U.S. PATENT DOCUMENTS

| | | | |
|---|---|---|---|
| 2,607,440 | 8/1952 | Lewis | 55/82 X |
| 3,786,135 | 1/1974 | King et al. | 423/136 X |
| 3,930,800 | 1/1976 | Schoener et al. | 423/495 X |
| 3,956,455 | 5/1976 | King et al. | 423/136 |

*Primary Examiner*—Edward Stern
*Attorney, Agent, or Firm*—John P. Taylor

[57] ABSTRACT

Recovery of high purity aluminum chloride is achieved by use of a series of condensers wherein the first condenser is operated at a high temperature of 80°–110° C to insure minimum condensation of other metal chlorides such as titanium chloride, silicon chloride, or the like, while a second condenser operates at a much lower temperature of from 20°–50° C to trap all impurities while reducing the chloride losses to a minimum. The product of the first condenser may then be used as a feed for the electrolytic reduction of aluminum chloride to metallic aluminum.

3 Claims, 1 Drawing Figure

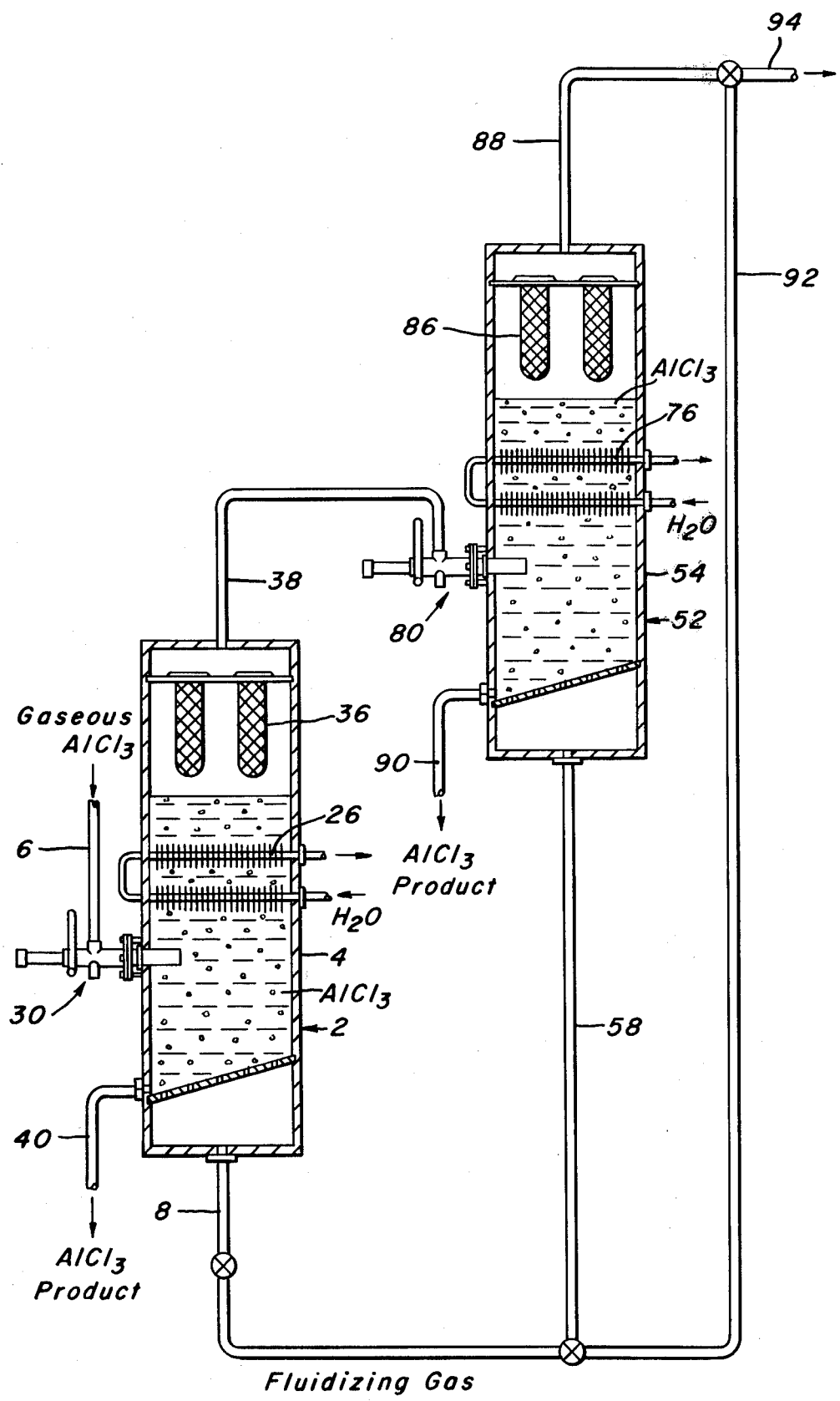

METHOD OF PRODUCING HIGH PURITY ALUMINUM CHLORIDE

BACKGROUND OF THE INVENTION

This invention relates to the production of aluminum chloride and more particularly to the production of high purity aluminum chloride while minimizing chloride losses.

In the production of aluminum chloride suitable for subsequent electrolytic reduction to metallic aluminum by the chlorination of materials containing compounds of aluminum as well as other materials such as silicon, titanium, and iron, the resulting chlorides must be separated to provide a sufficiently high purity aluminum chloride for the subsequent electrolytic process to perform in a satisfactory manner. In King et al U.S. Pat. No. 3,786,135 there is disclosed and claimed a process for the recovery of high purity aluminum chloride from the gaseous effluent of chlorination of aluminum compounds which involves a first step of initially cooling the hot gaseous effluent sufficiently to selectively condense sodium aluminum chloride values therefrom and separating such initially condensed values as well as entrained particles from the gaseous effluent followed by a further cooling of the gaseous effluent to a second and lower predetermined temperature range to condense a high proportion of the remaining volatile constituents that are condensable above the condensation temperature of aluminum chloride. The final step claimed in that process relates to the direct desublimation of high purity aluminum chloride values in a fluidized bed of aluminum chloride at a temperature range of from about 30°–100° C. In this third or final step in the recovery of aluminum chloride, it is desirable to condense or desublime the aluminum chloride at as high a temperature as possible to inhibit concurrent desublimation or condensation of other metal chlorides such as titanium chloride, silicon chloride, or the like. Interrelated thereto is a particle size control which is also, under certain conditions, temperature-dependent. In the concurrently filed patent application Ser. No. 765,458 entitled "Control of Purity and Particle Size in Production of Aluminum Chloride" there has been proposed a set of operating conditions which, in a single condenser or desublimation apparatus, seeks to control the purity of the product as well as the particle size while attempting to mitigate the chloride losses by operating the condensing or desublimation apparatus at a temperature of about 60°–80° C and controlling both the entrance velocity of the aluminum chloride gases and the overall throughput volume as well as by removing the particles of aluminum chloride from the bottom or adjacent the bottom of the condensation apparatus.

SUMMARY OF THE INVENTION

It is an object of this invention to provide an alternate means for controlling the purity of the aluminum chloride while maintaining the particle size range and at the same time minimizing the chloride losses.

In accordance with the present invention, aluminum chloride vapors are passed through a first condensation apparatus maintained at a temperature of from 80°–110° C at an entrance velocity of 18 meters/sec to 90 meters/sec. The particles of aluminum chloride are removed adjacent the bottom of the condensation apparatus. The remaining vapors are passed at an entrance velocity of 18–90 meters/sec to a second condensation apparatus maintained at a temperature of from about 20° C to about 50° C. The resultant low temperature of the second condensation apparatus insures capture of substantially all of the chloride values which enter the second apparatus from the first condensation apparatus.

BRIEF DESCRIPTION OF THE DRAWING

The sole drawing of the invention is a vertical, cross sectional section illustrating the invention.

DESCRIPTION OF THE INVENTION

Referring now to the drawing, a first fluidized bed is shown at 2 comprising a vessel having a sidewall 4 through which the aluminum chloride vapors enter via a conduit 6 which terminates in a nozzle 30 which protrudes into fluidized bed 2 a sufficient distance to inhibit premature condensation or desublimation of the aluminum chloride vapors at the nozzle itself. "Desublimation" and "desublime" as utilized herein refer to the direct formation of solid aluminum chloride from the gaseous phase without any noticeable formation of an intermediate liquid phase while "condensation" and "condense" are intended to refer to conversion of the aluminum chloride or other vapors either into a liquid or solid phase.

Means may be provided adjacent inlet 30 for maintaining the temperature of the incoming gas at an elevated value to prevent such premature condensation and such means may suitably comprise auxiliary heating means such as electric resistance heating means, or the like, or may comprise heat insulation material such as quartz, alumina, graphite, asbestos, and the like, at the entrance thereof to minimize, if not prevent, the premature cooling and liquefaction or solidification of the gaseous aluminum chloride passing therethrough which would otherwise tend to clog or impede passage of the gases therethrough. The chloride vapors condense within fluidized bed 2 on fluidized aluminum chloride particles having a particle size range of 1–500 microns which are fluidized by a fluidizing gas which enters fluidized bed 2 at inlet 8. As the aluminum chloride vapors condense or desublime on the particles of aluminum chloride the particles increase in size, with the larger particles remaining near the bottom of the bed. The larger particles are then periodically removed at exit port 50 which is located adjacent the bottom of fluidized bed 2. By adjacent the bottom of fluidized bed 2 is meant a position which is either at the bottom or within 10% of the bottom of the fluidized bed. By periodically is meant removal of 5 to 20% of the bed every hour.

In accordance with the invention, the fluidized particles are maintained at a temperature of 80°–110° C by cooling coils 26 which cool the fluidized bed down to the desired temperature range. By maintaining the bed at this temperature, impurities such as titanium chloride and silicon chloride remain in the vapor state resulting in an aluminum chloride purity of greater than 99.5%. It should be noted that the aluminum chloride vapors entering the fluidized bed 2 have an inlet temperature which may be as high as 150°–250° C. As the aluminum chloride vapors condense on the particles in fluidized bed 2, the remaining gas, including the fluidizing gas, rises to the top of fluidized bed 2 wherein solid particles are restrained via filter bags 36 while the remaining gas and volatile chlorides leave fluidized bed 2 via line 38.

In accordance with the invention, the hot gases leaving fluidized bed 2 via line 38 are introduced into a second fluidized bed 52 via a nozzle 80 therein which is similar to nozzle 30 in fluidized bed 2. In fact, both fluidized beds may be identical to one another from the standpoint of the fluidizing mechanism, the exit port, the filter bags, and the cooling coils. However, in accordance with the invention, cooling coils 76 in fluidized bed 52 maintain the temperature of the fluidized particles at a temperature of about 20°-50° C to insure complete capture of all chloride values therein. These chlorides are then removed via exit port 90 which, as previously indicated, is positioned in a similar position to exit port 40 in fluidized bed 2. The same rate of removal of the particles can be used as in the first fluidized bed, i.e. 5-20% per hour. Remaining gases, including the fluidizing gases, then pass through filters 86 into line 88 wherein they can be passed on via line 94 for further purification or recycled via line 92 back to lines 8 and/or lines 58 for reuse as fluidizing gas in fluidized beds 2 and 52.

As previously discussed, in the King et al patent the use of higher temperatures can result in the formation of larger particles than would be normally desired for ease in handling in subsequent use in the electrolytic reduction of aluminum chloride to form metallic aluminum. Conversely, however, it is desirable, in accordance with the invention, to run fluidized bed 2 at a very high temperature to mitigate or prevent undesirable condensation of other chloride impurities such as silicon chloride or titanium chloride. Therefore, to compensate for the tendency to form larger particles, the use of bottom draining of the fluidized bed via exit port 40 is practiced. Also, in accordance with the invention, to control the particle size of the high purity aluminum chloride being formed, it is necessary to control the entrance velocity of the aluminum chloride vapors through nozzle 30 to obtain a particle size distribution satisfactory for proper operation of the fluidized beds. The entrance velocity therefore should be controlled to be from 18 to 90 meters/sec.

The following example will serve to further illustrate the advantages of the invention:

EXAMPLE

Aluminum chloride vapors are passed through a fluidized bed initially containing 50 grams of aluminum chloride particles at an entrance velocity of about 90 meters/second while maintaining the bed temperature at 80°-110° C. The uncondensed vapors pass through the fluidized bed and are then passed through a filter and exit port to a second fluidized bed of aluminum chloride particles maintained at a temperature of 20°-50° C to cause condensation or desublimation of the remaining aluminum chloride vapors. Periodic removal of from 5-20% by weight of the aluminum chloride particles from the first bed yields particles which can be analyzed to show 0.004% by weight or less titanium tetrachloride. Analysis of the off-gases from the second fluidized bed show a minimum amount of aluminum chloride still remaining in vapor forms indicating that the chloride losses have been reduced to a minimum.

What is claimed is:

1. In the process for the recovery of high purity particulate aluminum chloride from a chlorinator by the condensation of hot aluminum chloride vapors the improvement which comprises:
   a. introducing the aluminum chloride vapors at an entrance velocity of 18 to 90 meters/sec into a first fluidized bed having a particle size range of 1-500 microns of aluminum chloride particles maintained at a temperature of 80°-110° C;
   b. removing solid particles of aluminum chloride from the fluidized bed at a point adjacent the bottom of the fluidized bed; and
   c. passing the remaining uncondensed gases and vapors from said first fluidized bed at an entrance velocity of 18-90 meter sec into a second fluidized bed of aluminum chloride particles having a particle size range of 1-500 microns and maintained at a temperature of 20°-50° C to recover the remainder of the chloride values from said gases and vapors.

2. The process of claim 1 wherein from 5-20% by weight of the total first fluidized bed of aluminum chloride particles are removed from adjacent the bottom of said first bed each hour.

3. The process of claim 2 wherein from 5-20% by weight of the total second fluidized bed of aluminum chloride particles are removed from adjacent the bottom of said second bed each hour.

* * * * *

UNITED STATES PATENT AND TRADEMARK OFFICE
CERTIFICATE OF CORRECTION

PATENT NO. : 4,070,448
DATED : January 24, 1978
INVENTOR(S) : Stanley C. Jacobs et al It is certified that error appears in the above-identified patent and that said Letters Patent are hereby corrected as shown below:

Col. 4, line 14           Change "forms" to --form--.

Claim 1,
Col. 4, line 32           Change "meter sec" to --meters/sec--.

Signed and Sealed this

Sixteenth Day of May 1978

[SEAL]

Attest:

RUTH C. MASON
Attesting Officer

LUTRELLE F. PARKER
Acting Commissioner of Patents and Trademarks